May 29, 1956    B. G. JOHNSON ET AL    2,747,441
SPOT AND BORE MACHINE
Filed Aug. 28, 1953    2 Sheets-Sheet 1
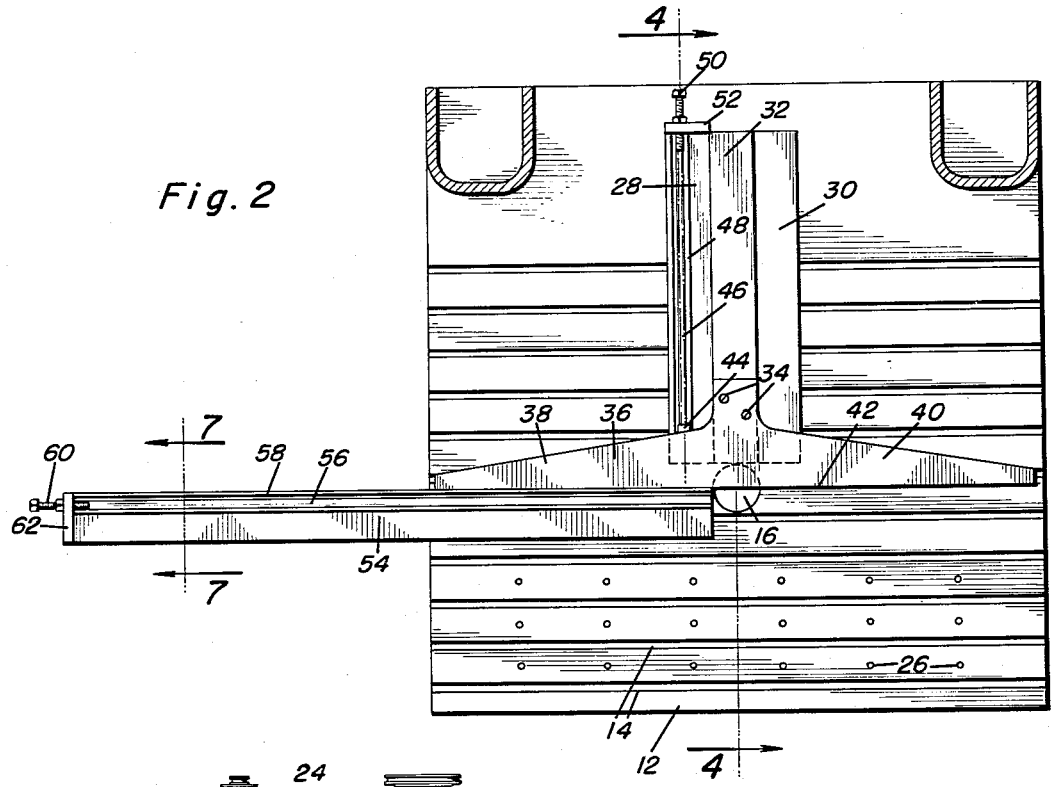
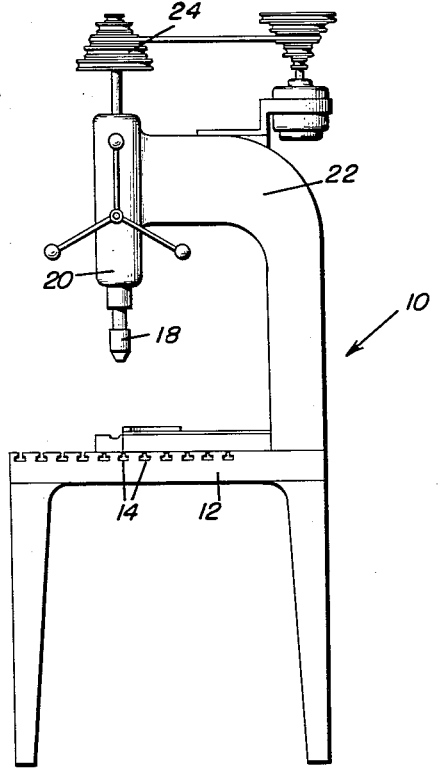
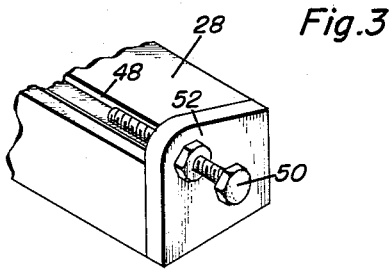
Bernard G. Johnson
Harold S. Johnson
INVENTORS.
BY *Clarence A. O'Brien*
*and Harvey B. Jacobson*
Attorneys May 29, 1956  B. G. JOHNSON ET AL  2,747,441
SPOT AND BORE MACHINE Filed Aug. 28, 1953  2 Sheets-Sheet 2

Bernard G. Johnson
Harold S. Johnson
INVENTORS.

BY *Clarence A. O'Brien
and Harvey B. Jacobson*
Attorneys

United States Patent Office 2,747,441
Patented May 29, 1956

2,747,441

SPOT AND BORE MACHINE

Bernard G. Johnson and Harold S. Johnson, Brookfield, Ill.

Application August 28, 1953, Serial No. 377,114

5 Claims. (Cl. 77—63)

This invention relates to the class of machine tools and more particularly to a novel spot and bore machine for accurately machining of work pieces to a degree of accuracy comparable with conventional jig-boring machines.

The primary object of the present invention resides in the provision of a means for adjusting a work piece relative to a rotary drilling head of a machine provided with a table and a rotary drilling head supported thereabove in the manner of a conventional drill press whereby highly accurate work can be accomplished.

The construction of this invention features the use of a pair of guide blocks within which a slide carrying a work piece engaging member having outwardly extending arms is adjustably positioned. One of the guide blocks carries a suitable tram rod for adjusting the position of the work piece engaging member. There is also provided a transverse stationary guide carrying another tram rod for engaging and adjusting the work piece.

Still further objects of this invention reside in the provision of a spot and bore machine that is strong and durable, simple in construction and operation, which may be readily arranged from conventional existing drill presses and like machines and which is relatively simple to manufacture.

These, together with the various ancillary objects and features of the invention which will become apparent as the following description proceeds, are attained by this spot and bore machine, a preferred embodiment of which has been illustrated in the accompanying drawings, by way of example only, wherein:

Figure 1 is a side elevational view illustrating a spot bore machine comprising the present invention;

Figure 2 is a plan view of the table and associated elements incorporated in the spot and bore machine;

Figure 3 is a partial perspective view illustrating the end pieces which are secured to the stationary guide and one of the guide blocks for receiving the adjusting screws for adjusting the position of the tram rods;

Figure 5:
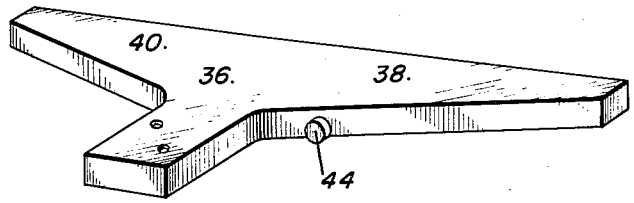
Figure 5 is a perspective view of the work piece engaging member which is secured to the slide receivable between the sides of the blocks fixed to the table of the machine.
Figure 4:
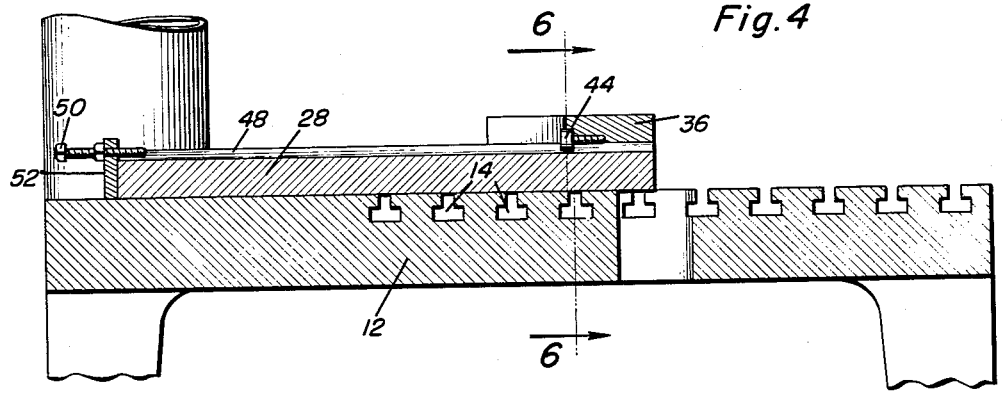
Figure 4 is a vertical, sectional view as taken along the plane of line 4—4 in Figure 2 and illustrating the relative arrangement of parts of the invention.
Figure 6:
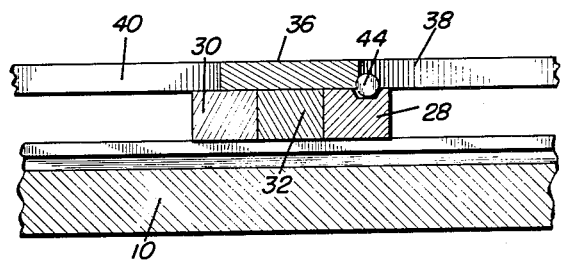
Figure 6 is a sectional detail view as taken along the plane of line 6—6 in Figure 4.

With continuing reference to the accompanying drawings wherein like reference numerals designate similar parts throughout the various views, reference numeral 10 generally designates the spot and bore machine comprising the present invention which includes a table 12 having transversely extending keying grooves 14 therein as is conventional for receiving clamps and other special pieces of equipment. There is also provided an aperture 16 therethrough above which the chuck 18 of a rotary drilling head 20 is positioned. The drilling head 20 is carried by a suitable supporting structure 22 and may be powered in any suitable manner as by an arrangement of belts and pulleys as is generally indicated by reference number 24. The table 12 may have suitable apertures therethrough as indicated at 26 for reception of the fastening elements of special tools and for extension tables and the like.

This invention features the use of a pair of guide blocks 28 and 30 which are fixedly secured to the table 12 in any suitable manner. Obviously, the guide blocks 28 and 30 may be provided with keys adapted to fit in the key grooves 14 or may be otherwise rigidly secured to the table 12. The guide blocks 28 and 30 are arranged in spaced relationship and form a guide for a removable slide 32 which is carefully machined for adjustably sliding within the space between the guide blocks 28 and 30. The slide 32 has attached thereto as by the screws 34 or by other suitable means, a work piece engaging member 36 having a pair of outwardly extending arms 38 and 40 along which the work piece is adapted to be supported. The work piece engaging member 36 is therefore provided with a plane face 42 against which the work piece may be positioned. Secured at the arm 36 at the rear end thereof and generally indicated at 44 is a tram block which is adapted to be engaged by a tram rod 46 mounted within a substantially V-shaped slot or groove 48 in the guide block 28. The rod 46 is adjustably positioned by means of an adjusting screw 50 which is threadedly engaged in an end plate 52 attached to the guide block 28 at the outermost end thereof. Hence, by adjusting the screw 50 the tram rod 46 can be utilized to adjust the position of the slide assembly including the slide 32 and the work piece engaging member 36. The work piece engaging member 36 is shown in a forward limit position in Figure 2.

Figure 7:
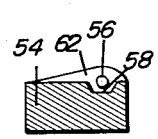
Figure 7 is a sectional detail view as taken along the plane of line 7—7 in Figure 2 and illustrating the arrangement of parts of the stationary guide.

There is also fixedly mounted on the table 12 a stationary guide 54 which extends transversely relative to the table 12 and can be secured to the guide blocks 28 and 30. The stationary guide 54 carries a tram rod 56 within a truncated V-shaped groove 58 the shape of which can be best seen in Figure 7 and which is similar to the groove 48 in the guide block 28.

The tram rod 56 is adjusted by means of a screw 60 similar to the screw 50 which extends through an end plate 62 attached to the outer end of the stationary guide 54 in a similar manner to the relative position of the end plate 52 and the guide block 28.

In the utilization of this spot and bore machine with two sides of the work piece trued normal to each other the work piece may be readily positioned on the table 12 bearing against the edge 42 of the work piece engaging member 36 and the inner end of the stationary guide 54. Then, using various sizes and combinations of tram rods 46 and 56 the work piece is readily positioned in a manner such that the center of the hole to be bored may be readily spotted. Then, using another drill press or other suitable machine an aperture can be drilled through the work piece so as to avoid the general messiness usually incurred by drilling. After the aperture has been formed in the work piece this aperture may be very carefully machined and bored by repositioning it on the table 12 against the edge 42 of the work piece engaging member 36. The adjustment screws 50 and 60 are utilized to reorient the arrangement of parts only to take up wear and for like reasons and are preferably originally factory adjusted.

It is to be noted that when large work pieces are utilized, extension tables may be bolted or otherwise attached utilizing the apertures 26 in the table 12.

Since from the foregoing the construction and advantages of this spot and bore machine are readily apparent, further description is believed to be unnecessary.

However, since numerous modifications will readily occur to those skilled in the art, after consideration of the foregoing specification and accompanying drawings, it is not intended to limit the invention to the exact construction shown and described, but all suitable modifications and equivalents may be readily resorted to.

What is claimed as new is as follows:

1. A spot and bore machine including a rotary drill head adjustably supported above a table, said table having a pair of fixed guide blocks attached thereto, a first tram rod carried by a first of said guide blocks, a slide adjustably positioned on said table between said guide blocks, a back work piece engaging member carried by said slide, said member being engaged by said tram rod, and a stationary guide secured on said table, having a second tram rod adjustably carried thereby extending perpendicular to said first tram rod.

2. A spot and bore machine including a rotary drill head adjustably supported above a table, said table having a pair of fixed guide blocks attached thereto, a first tram rod carried by a first of said guide blocks, a slide adjustably positioned on said table between said guide blocks, a back work piece engaging member carried by said slide, said member being engaged by said tram rod, and a stationary guide secured on said table, having a second tram rod adjustably carried thereby extending perpendicular to said first tram rod, said first guide block and said stationary guide having grooves therein for reception of said tram rods.

3. A spot and bore machine including a rotary drill head adjustably supported above a table, said table having a pair of fixed guide blocks attached thereto, a first tram rod carried by a first of said guide blocks, a slide adjustably positioned on said table between said guide blocks, a back work piece engaging member carried by said slide, said member being engaged by said tram rod, and a stationary guide secured on said table, having a second tram rod adjustably carried thereby extending perpendicular to said first tram rod, said first guide block and said stationary guide having grooves therein for reception of said tram rods, said first guide block and said stationary guide having grooves therein for reception of said tram rods, said first guide block and said stationary guide having end plates attached thereto, and adjusting screws secured in said end plates engaging said tram rods, said adjusting screws extending into said grooves.

4. A spot and bore machine including a rotary drill head adjustably supported above a table, said table having a pair of fixed guide blocks attached thereto, a first tram rod carried by a first of said guide blocks, a slide adjustably positioned on said table between said guide blocks, a back work piece engaging member carried by said slide, said member being engaged by said tram rod, and a stationary guide secured on said table, having a second tram rod adjustably carried thereby extending perpendicular to said first tram rod, said back member having outwardly extending arms normal to said guides, one of said arms carrying a tram block engaged by said first tram rod.

5. A spot and bore machine including a rotary drill head adjustably supported above a table, said table having a pair of fixed guide blocks attached thereto, a first tram rod carried by a first of said guide blocks, a slide adjustably positioned on said table between said guide blocks, a back work piece engaging member carried by said slide, said member being engaged by said tram rod, and a stationary guide secured on said table, having a second tram rod adjustably carried thereby extending perpendicular to said first tram rod, said back member having outwardly extending arms normal to said guides, one of said arms carrying a tram block engaged by said first tram rod, said first guide block and said stationary guide having grooves therein for reception of said tram rods, said first guide block and said stationary guide having end plates attached thereto, and adjusting screws secured in said end plates engaging said tram rods.

References Cited in the file of this patent

UNITED STATES PATENTS

| | | |
|---|---|---|
| 1,392,734 | Aldeen et al. | Oct. 4, 1921 |
| 2,503,392 | Kreipl | Apr. 11, 1950 |